United States Patent
Hinterberger et al.

(10) Patent No.: US 10,615,464 B2
(45) Date of Patent: Apr. 7, 2020

(54) BATTERY CELL FOR A BATTERY OF A MOTOR VEHICLE, BATTERY AND MOTOR VEHICLE

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 114 days.

(21) Appl. No.: 15/550,835

(22) PCT Filed: Feb. 16, 2016

(86) PCT No.: PCT/EP2016/053275
§ 371 (c)(1),
(2) Date: Aug. 14, 2017

(87) PCT Pub. No.: WO2016/131829
PCT Pub. Date: Aug. 25, 2016

(65) Prior Publication Data
US 2018/0034114 A1 Feb. 1, 2018

(30) Foreign Application Priority Data
Feb. 18, 2015 (DE) ........................ 10 2015 002 069

(51) Int. Cl.
*H01M 10/48* (2006.01)
*H01M 2/34* (2006.01)
(Continued)

(52) U.S. Cl.
CPC ......... *H01M 10/482* (2013.01); *B60L 3/0046* (2013.01); *B60L 3/04* (2013.01);
(Continued)

(58) Field of Classification Search
None
See application file for complete search history.

(56) References Cited

U.S. PATENT DOCUMENTS

| 4,947,123 A | 8/1990 | Minezawa |
| 2012/0211569 A1 | 8/2012 | Krawczewicz et al. |

(Continued)

FOREIGN PATENT DOCUMENTS

| CN | 204156052 U | 2/2015 |
| DE | 102009027177 A1 | 12/2010 |

(Continued)

OTHER PUBLICATIONS

English translation of Shafer DE 102011117474 obtained Jan. 31, 2019 (Year: 2013).*

(Continued)

*Primary Examiner* — Sarah A. Slifka
(74) *Attorney, Agent, or Firm* — Maier & Maier, PLLC

(57) ABSTRACT

A battery cell for a battery of a motor vehicle with a battery cell housing, in which a galvanic element is housed. The battery cell can be electrically connected by way of two electrical connection terminals, to at least one other battery cell of the battery. The battery cell has an indicator device, on the basis of which a state of the battery cell can be identified from outside of the battery cell housing. The state depends on at least one parameter of the battery cell that can be detected or recorded by measurement technology, and the indicator device is designed for the purpose of indicating a change in the state of the battery cell. Furthermore, the invention relates to a battery having a plurality of such battery cells and to a motor vehicle having a battery.

8 Claims, 1 Drawing Sheet

(51) Int. Cl.
*H01M 10/42* (2006.01)
*B60L 3/00* (2019.01)
*B60L 3/04* (2006.01)
*H01M 10/0525* (2010.01)

(52) U.S. Cl.
CPC .......... *H01M 2/34* (2013.01); *H01M 10/425* (2013.01); *H01M 10/4257* (2013.01); *H01M 10/48* (2013.01); *H01M 10/484* (2013.01); *H01M 10/486* (2013.01); *H01M 10/488* (2013.01); *B60L 2250/16* (2013.01); *H01M 10/0525* (2013.01); *H01M 2010/4278* (2013.01); *H01M 2220/20* (2013.01); *Y02E 60/122* (2013.01)

(56) References Cited

U.S. PATENT DOCUMENTS

| | | |
|---|---|---|
| 2012/0242144 A1 | 9/2012 | Chorian et al. |
| 2014/0242422 A1 | 8/2014 | Hakansson et al. |

FOREIGN PATENT DOCUMENTS

| | | |
|---|---|---|
| DE | 102010045037 A1 | 3/2011 |
| DE | 102009050125 A1 | 4/2011 |
| DE | 102010043710 A1 | 5/2012 |
| DE | 102010061025 A1 | 6/2012 |
| DE | 102011117474 A1 | 5/2013 |
| EP | 2487498 A2 | 8/2012 |

OTHER PUBLICATIONS

Examination Report dated Dec. 10, 2015 of corresponding German application No. 102015002069.2; 6 pgs.
Examination Report dated Oct. 31, 2016 of corresponding German application No. 102015002069.2; 8 pgs.
International Search Report dated Apr. 4, 2016 of corresponding International application No. PCT/EP2016/053275; 16 pgs.
Notification of Transmittal of Translation of the International Preliminary Report on Patentability dated Aug. 31, 2017, in connection with corresponding international application No. PCT/EP2016/053275 (7 pages).

\* cited by examiner

BATTERY CELL FOR A BATTERY OF A MOTOR VEHICLE, BATTERY AND MOTOR VEHICLE

FIELD

The invention relates to a battery cell for a battery of a motor vehicle. The battery cell comprises a battery cell housing, in which a galvanic element is housed. The battery cell can be electrically connected to at least one other battery cell of the battery by way of two electrical connection terminals. Furthermore, the invention relates to a battery having a plurality of such battery cells and to a motor vehicle having a battery.

BACKGROUND

It is known from the prior art, for instance from DE 10 2010 045 037 A1, to interconnect a plurality of battery cells for supplying a specific voltage or a specific current to a battery. Such batteries are employed at the present time, in particular, as traction batteries in motor vehicles, such as, for instance, electric vehicles or hybrid vehicles, for supplying electrical drive energy.

Normally, an electrical voltage is present at the connection terminals or battery poles of battery cells known from the prior art. In the case that many battery cells are then connected together in a series circuit, high and dangerous voltages can result. For example, a traction battery can supply a voltage of several hundred volts for a motor vehicle. Accordingly, it is of interest to know the voltage actually present at the connection terminals of a battery cell.

A conclusion can be drawn about the state of charge of the battery cell through a voltage measurement by using a voltmeter, for instance. In this case, it is to be regarded as a drawback that this electrical state of the battery cell cannot be identified without the use of technical means. As a result of this, it is not possible to identify simply and right away a potential risk arising from the battery cell.

SUMMARY OF THE DISCLOSURE

The object of the present invention, therefore, is to create a battery cell, a battery, and a motor vehicle of the type mentioned in the beginning, for which an especially safe handling of the battery cell or of the battery is made possible.

The battery cell according to the invention has an indicator device, on the basis of which a state of the battery cell that is dependent on at least one parameter of the battery cell, which can be detected or recorded by measurement technology, can be identified from outside of the battery cell housing. Said indicator device here is designed for the purpose of indicating a change in the state of the battery cell. In other words, the indicator device is not static, but capable of indicating the current state of the battery cell and therefore, in particular, to communicate via an optically detectable path or in some other way.

Through integration of such an indicator device or of a status indicator of this type into the battery cell, it is therefore possible to signal different states of the battery cell, in particular through a visualization of the status of the battery cell. Created thereby is an active state display of the battery cell, by means of which the status of the battery cell can be detected instantly. Such a status feedback of the battery cell makes possible, in particular, an especially safe handling of the battery cell. Namely, a person handling the battery cell can draw a conclusion on the state of the battery cell on the basis of the indicator device.

This is of advantage, in particular, in battery manufacture, but also in the case of later work conducted on the battery, for instance, by customer service. When the battery that has battery cells with the indicator device is employed in a motor vehicle, the state of the respective battery can be brought, by means of the indicator device, to the attention of persons who, for example, following an accident, deal with the motor vehicle involved in the accident. It is thereby possible, in particular, to reduce any hazard to emergency responders or other aid workers.

The galvanic element of the battery cell is preferably designed as a secondary element, which can be discharged for supplying an electrical component and, after being discharged, can be recharged. The galvanic element hereby comprises, in a way that is known as such, arresters in the form of metal foils, for instance, which are coated with the electrochemically active material of the electrodes of the galvanic element. Further provided is an electrolyte as well as a separator, which isolates the electrochemically active materials from one another. In such a galvanic element, the arresters can be stacked, folded, or coiled, so that the galvanic element may also be referred to as a cell stack or cell coil.

It is especially advantageous when the indicator device is designed for the purpose of indicating a switching state of at least one switching element, which is designed for making and breaking an electrically conductive connection between an arrester of the galvanic element and at least one of the electrical connection terminals. It is then possible, namely, to very readily identify from the outside whether or not a voltage is present at the connection terminals of the battery cell. If, when the switching element is opened, the electrically conductive connection between the arrester and at least one of the electrical connection terminals is interrupted, then current flow can no longer take place through the battery cell. As a result of this, the battery cell can be handled safely. Such an indication of the switching state from the outside is therefore especially desirable in regard to safe handling of the battery cell.

In particular, when the battery cell is electrically connected to other battery cells in series and high voltages can therefore occur at a battery having the battery cells or at a battery module, it is advantageous when the switching element is arranged between each of the two arresters of the galvanic element and the respective electrical connection terminal. By providing two switching elements in each battery, it is namely possible to ensure an especially safe disconnection of the galvanic element from other battery cells of the battery.

It is possible to design the switching element as a relay. This then enables an especially safe galvanic isolation to be achieved. However, such a mechanically operating component demands a relatively large structural space inside the battery cell. It is therefore preferred to design the at least one switching element as a semiconductor component. Such a semiconductor component can be brought especially simply and rapidly into the desired switching state, with the energy needed to be provided for this being extremely small. Furthermore, it is possible to provide a combination of a relay and a semiconductor component in order to be able to interrupt the electrically conductive connection especially rapidly and also especially safely.

The at least one switching element can be designed as a semiconductor component, which can be switched by means of a driver module. The switching behavior of the switching element can then be adjusted or programmed in dependence on a plurality of influencing parameters. By providing such a driver module or driver for actuation of the semiconductor component, an intelligence is imparted to the battery cell; that is, the battery cell is therefore designed as a so-called "SmartCell" (intelligent battery cell). This makes it possible to derive or stipulate switching criteria, for instance by inputting characteristics or families of characteristics in a memory of the driver module. In this way, the safe operation of the battery cell can be especially well ensured.

By means of the switchable battery cell, it is possible to ensure the functional safety of the battery cell itself as well as of all parts and components thereof in accordance with internationally specified safety requirements, for example in accordance with the D level of the ASIL (Automotive Safety Integrity Level).

It is also possible to determine with certainty whether the switching element is closed or open in accordance with the ASIL D level and to signal or indicate this by means of the indicator device.

Preferably, the driver module is arranged inside of the battery cell housing. The driver module is then well protected. Furthermore, it is possible in this way to convey signals of sensors to the driver module especially well, said sensors recording parameters of the battery cell and also being located for this inside of the battery cell housing.

The semiconductor component can be designed as a binary switch, for which, in one switching state, the electrically conductive connection between the arrester and the at least one electrical connection terminal is interrupted and, in the other switching state, the electrically conductive connection is produced. This can be realized, for example, by providing a power transistor as the semiconductor component.

The driver module can be integrated into the indicator device. In particular, however, when the driver module is arranged inside of the battery cell housing and the indicator device is arranged at an outer side of the battery cell housing, a design of these components as mutually separated components is also possible.

The arrangement of the indicator device at an outer side of the battery cell housing facilitates the recording of the state of the battery cell from the outside on the basis of the indicator device. However, the indicator device can also form a section of the battery cell housing; that is, for instance, it can be integrated into a wall of the battery cell housing.

Particularly when the indicator device is arranged at an outer side of the battery cell housing, it is possible to accommodate the indicator device between the two connection terminals in a space-saving manner, because the two connection terminals can protrude prominently over the outer side of the battery cell housing. As a result of the arrangement of the indicator device between the two connection terminals, the structural space present there can be exploited especially well.

It has further been shown to be advantageous when the indicator device is designed for the purpose of indicating a transport state and/or an installation state of the battery cell, with it being possible to activate the transport state and/or the installation state by means of a control unit of the battery cell. When, namely, for example, the battery cell can be brought into an appropriate state for the transport or for the installation or production, in which no hazard arises from the battery cell, the display of this transport state or installation state is especially meaningful.

For example, during transport of the battery cell, it is possible by means of the switching element to interrupt the electrically conductive connection between the arresters of the galvanic element and the electrical connection terminals of the battery cell, so that no voltage can be tapped at the connection terminals or battery poles. The battery cell can then be transported safely.

It is also possible during the installation of the battery cell, that is, during its installation in a battery and accordingly during the production of batteries, to switch the connection terminals of the battery in a volt-free manner by opening the at least one switching element. This safe state of the battery cell can then be signaled to the outside by means of the indicator device during transport or installation. This makes the handling of a battery having the battery cells especially safe.

Furthermore, the indicator device is preferably designed for the purpose of indicating a defect in the battery cell. This is advantageous both in regard to service of a battery that has a plurality of the battery cells and also in regard to the production of the battery for which a plurality of battery cells are connected to one another in an electrically conductive manner. In this way, it is namely possible to replace or repair the defective battery.

The defect can involve, for example, an insulation defect, for instance when the arresters of the galvanic element touch or when the galvanic element comes into electrically conductive contact with the battery cell housing, which is manufactured, in turn, from an electrically conductive material, such as, for example, aluminum. However, a high electrical, thermal, or other load incurred in the past, such as, for instance, a pressure load on and/or an acceleration of the battery cell, can lead to a defect in the battery cell, which can be signaled advantageously by means of the indicator device. The same applies when the defect consists in the inability of the battery cell to supply the desired voltage or charge quantity.

It has further been shown to be advantageous when the indicator device and/or at least one sensor coupled to the indicator device are or is designed for the purpose of recording the at least one parameter, with the indicator device being designed for the purpose of indicating the state of the battery cell in relation to the at least one parameter. For example, it is possible by means of the indicator device to record a voltage of the battery cell, for instance the voltage present at the arresters of the galvanic element.

When the indicator device is coupled to a sensor that can record the temperature, it is possible, additionally or alternatively, to record the temperature inside of the battery cell and/or outside of the battery cell. This makes it possible, for instance, to signal the cell voltage and/or the temperature to the outside, with it being possible, for example, to alert a person handling the battery to a low voltage or a high temperature. Such information can also allow conclusions to be drawn about a defect in the battery cell, for instance when, during charging of the battery cell, said battery cell reaches a high temperature, but only a moderate voltage. Such information can be linked, in particular, to the information about the switching state of the at least one switching element and mirrored or signaled to the outside. Accordingly, the person handling the battery cell can be informed especially well about the respective momentary state of the battery cell.

However, for evaluation of the state of the battery cell, other parameters are also of interest. Accordingly, it is possible for the parameters that can be recorded by means of the indicator device and/or by means of the at least one sensor to comprise the current intensity of a current flowing the battery cell and/or a pressure and/or mechanical stresses and/or a nature of an electrolyte of the galvanic element and/or an acceleration. Thus, the person handling the battery cell can obtain an especially comprehensive picture of the state of the battery cell.

It has further been shown to be advantageous when the indicator device is designed for the purpose of indicating at least one single value, which, for example, can give the state of charge and/or the state of health of the battery cell. The state of health (SoH) enables information about the state of aging of the battery cell to be obtained. Moreover, it is informative when the indicator device can show a single value that indicates a number of charging operations and/or discharging operations of the battery cell.

Beyond this, it is possible, on the basis of, in particular, peak values attained in the course of utilization of the battery cell, that is, highest values of temperature, pressure, voltage, current intensity, mechanical stresses, or accelerations to which the battery cell has been exposed, to draw conclusions about the state of the battery cell. Furthermore, for a comprehensive evaluation of the state of the battery cell, it is of value when the indicator device is designed for the purpose of indicating a value that gives a nature of an electrolyte of the galvanic element. Such information can be employed, in particular, for the purpose of deciding which function the battery cell can still fulfill. Thus, it is possible, via a replacement of the battery cell or a use thereof for another purpose to decide on, in particular, a purpose associated with lesser requirements. The state information of the battery cell can thus be utilized especially appropriately.

For indicating the state of the battery cell, the indicator device can comprise at least one illuminated device, such as, for instance, one or a plurality of signal lamps illuminated in different colors. For example, through use of the traffic light colors red, yellow, and green, particularly in combination with a simply comprehended system of symbols, it is possible to signal the current status or state of the battery cell in an easy manner that is simple to grasp.

Additionally or alternatively, the indicator device can comprise a display screen, that is, a display or a visualization unit of this kind. This makes it possible, in particular, to display the information giving the state of the battery cell in appropriately great detail.

Additionally or alternatively, the indicator device can be designed for emitting an acoustically detectable signal and/or of a haptically perceivable signal, which indicate or indicates the current state of the battery cell. It is also possible in this way for a person handling the battery to draw a conclusion from the outside about the state of the battery cell. For example, a signal tone can point to the state of the battery cell. Or by means of an ultrasound pulse, the battery housing can be caused to vibrate and thus the state of the battery cell signaled to the outside.

In a further advantageous embodiment, the indicator device is designed to amplify the signal correlating with the state of the battery cell. For example, it is possible by means of the indicator unit to detect a pulsating magnetic and/or electric field and to amplify a corresponding weak signal by means of the indicator unit, so that the state of the battery cell can be identified from outside of the battery cell housing. In this way, an outer, active indicator device is created, which, in particular, is capable of responding to slight changes in the state of the battery cell.

In order to supply the indicator device with electric energy, the indicator device can be coupled to the galvanic element. This is appropriate, in particular, when, in any case, the voltage supplied by the galvanic element is to be recorded and signaled by means of the indicator unit. In addition, in this way, the indicator device obtains the electric energy directly from the battery cell. However, this does not pose any problem in regard to the electric energy supplied by the battery cell, because the indicator device makes do with a very small quantity of energy; that is, it has preferably a low-power design, in particular an ultra-low-power design.

Additionally or alternatively, however, it is possible for supply of the indicator device to couple it with a separate electric energy storage unit, for instance with a capacitor arranged in the battery cell housing. The provision of such a separate energy storage unit makes the supply of the electric energy for the indicator device independent of the electric energy that the galvanic element of the battery cell supplies. In this way, it is possible to ensure a secure indication of the state of the battery cell.

In particular, such an electric energy storage unit can be charged along with charging of the battery cell. When a plurality of batteries having battery cells are used in the motor vehicle, this charging can occur during so-called recuperative operation, for instance. The separate energy storage unit can, however, also be co-charged after connection of the battery to a current source.

The indicator device can also be designed, in particular, as a passive indicator, which does not need to be supplied with electric energy from outside of the battery cell.

Finally, it has been shown to be advantageous when the indicator device is designed for receiving wirelessly transmitted energy. Namely, complicated conductor connections can then be dispensed with. When wireless energy transmission, for instance in the form of lightwaves, is used, it is also possible to signal the state of the battery cell. This can occur, for instance, by actuating a light-emitting diode that is attached to the outer side of the battery cell housing or integrated into the battery cell housing, for example with intermediate connection of a photo cell. In this case, too, such an external indicator device does not need any externally supplied energy.

The battery according to the invention comprises a plurality of battery cells according to the invention, which can be connected in series and/or in parallel.

The motor vehicle according to the invention comprises at least one battery according to the invention. The motor vehicle can be designed, for example, as a passenger car, in particular as an electric vehicle or hybrid vehicle. Furthermore, the motor vehicle can also be an electrically driven motorcycle or an electrically driven bicycle.

It is also possible to provide the battery in a stationary energy storage unit system. Beyond this, it can be provided that a battery that has been employed in a motor vehicle is reused as a so-called second-life battery, in which, therefore, the battery is conveyed to a different kind of use. In particular, in the case of second-life applications, it is namely possible for the requirements placed on the efficiency of the battery cells to be less stringent, for instance, than for use of the battery cells for the battery of the motor vehicle.

The advantages described for the battery cell according to the invention and for preferred embodiments also apply to the battery according to the invention and to the motor vehicle according to the invention.

BRIEF DESCRIPTION OF THE DRAWING

The features and combinations of features described above in the description as well as the features and combinations of features mentioned below in the descriptions of the figures and/or shown in the figures alone can be used not only in the respectively given combination, but also in other combinations, without departing from the scope of the invention. Accordingly, embodiments that are not explicitly shown or discussed in the figures are also to be regarded as included in and disclosed by the invention, although they ensue and can be produced from separate combinations of features from the discussed embodiments.

Further advantages, features, and details of the invention ensue from the claims, the following description of preferred embodiments, and the drawings. Shown are:

DETAILED DESCRIPTION OF THE DRAWING

Figure 1:
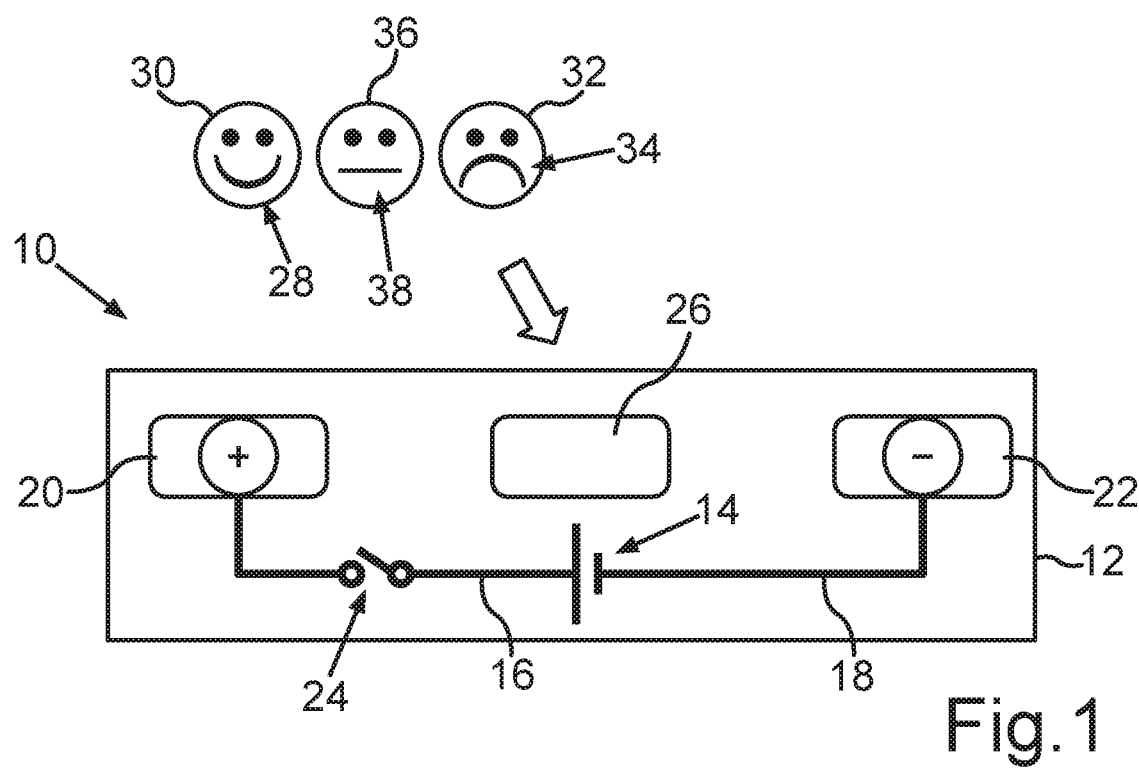
FIG. 1 highly schematically and in plan view, a battery cell with a switching element integrated into the battery cell, wherein it is possible by means of an indicator device of the battery cell to indicate a state thereof.

Shown schematically in FIG. 1 is a battery cell 10, such as one that can be employed, for example, in a battery of a motor vehicle. For this purpose, the battery cell 10 can be designed, for instance as a lithium ion cell. In a battery, such as one utilized as a traction battery for a motor vehicle, usually a plurality of such battery cells 10 are electrically connected in series and/or in parallel in order to supply appropriately high voltages and currents.

In the case of a series connection of such battery cells 10, a very high voltage and, namely, a voltage of several hundred volts of the battery can arise, because, for instance, a plurality of battery modules, each of which contains a plurality of battery cells 10, are connected to one another in an electrically conductive manner. However, these high voltages can also pose a hazard to persons on account of the occurrence of short circuits and electric arcs. Therefore, it is of interest for a person who is handling the battery cell 10 (or a battery that has a plurality of battery cells 10) to identify whether any hazard arises from the battery cell 10. This is achieved by the battery cell 10 described with reference to the figures.

The battery cell 10 comprises a battery cell housing 12, which, in the present case, has a prismatic design by way of example. Arranged inside of the battery cell housing 12 is a galvanic element 14, which comprises arresters 16, 18, coated with a respective electrochemical material. In the present case, for simplicity, the electrodes of the galvanic element 14, comprised of the electrochemically active material and the arresters 16, 18, are illustrated only by the arrester 16 leading to a first electrical connection terminal 20 (for instance, a plus pole) of the battery cell 10 and by the arrester 18 leading to a second electrical connection terminal 22 of the battery cell 10, that is, the arrester 18 leading to the minus pole.

In the case of the battery cell 10 shown in FIG. 1, however, it is possible to isolate the galvanic element 14 electrically from at least one of the connection terminals 20, 22. Provided for this is a switching element 24, by means of which an electrically conductive connection between the arrester 16 and the connection terminal 20 can be interrupted by opening the switching element 24. By closing the switching element 24, it is possible reestablish the electrically conductive connection between the arrester 16 and the connection terminal 20.

In an analogous way, it is possible to provide a second switching element (not illustrated), by means of which the electrically conductive connection between the arrester 18 and the connection terminal 22 can be interrupted or made. The switching element 24, which, in particular, can be designed as a semiconductor component, is switched in the present case by a driver module, which, just like the switching element 24, is arranged inside of the battery cell housing 12.

The battery cell 10 has an indicator device 26, by means of which the state of the battery cell 10 can be indicated to the person who is handling the battery cell 10. In particular, the electrical state, that is, whether a voltage is present at the connection terminals 20, 22 or battery poles, can be indicated by means of the indicator device 26. For this purpose, it is advantageously unnecessary to employ any assisting means, such as, for instance a voltmeter employed from the outside at the connection terminals 20, 22. It is namely possible, for instance, to signal the switching state of the switching element 24 to the outside by means of the indicator device 26.

Thus, it is possible, for example, to indicate by a signal lamp 30 or the like illuminated device, in particular one furnished with a positive symbol 28, that the switching element 24 is open and hence that the battery cell 10 can be handled in a safe manner. The signal lamp 30 can, in particular, be integrated into the indicator device 26. The symbol 28 can highlight the positive, that is, safe, state of the battery cell 10 in a way that is easy to grasp or else be provided alternatively to the signal lamp 30.

In this way, it is also possible, for example, to indicate a special mode or state of the battery cell 10, for instance a transport state or an installation state or production state, in which the battery cell 10 is deactivated by opening of the switching element 24.

In an analogous way, it is possible, by means of another signal lamp 32, which can also be furnished with a symbol 34 as status or state of the battery cell 10, to indicate that the switching element 24 is closed and, therefore, a voltage is present at the connection terminals 20, 22. In place of the further signal lamp 32, it can also be provided that the first signal lamp 30 illuminates in another color and/or another symbol 34, such as, for example, a symbol indicating the hazardous state of the battery cell, can be displayed on the indicator device 26.

An especially simply detectable state indicator can be realized when, in addition, another signal lamp 36 is then provided, which, in particular, can be supplemented by another symbol 38. In this case, the three signal lamps 30, 32, 36 can be illuminated, for example in the traffic light colors green, yellow, and red, in order to indicate different states of the battery cell 10. These signal colors can additionally be supplemented by the positive symbol 28, the negative symbol 34, or the neutral symbol 38 in order to depict the state of the battery cell 10 in a manner that is especially easy to grasp. Additionally or alternatively, a text or the like on the indicator device 26 can give the state of the battery cell 10.

Through the use of simple signal lamps 30, 32, 36 and/or of the symbols 28, 34, 38, however, it is also possible to communicate readily any defects in the battery cell 10 or other information giving the state of the battery cell 10. In this way, it is possible, for example, for the signal lamp 30 with the positive symbol 28 to indicate that everything is in order with the battery cell 10, whereas the signal lamp 32 with the negative symbol 34 can point to a defect in or poor state of the battery cell 10.

By means of the indicator device 26, which, in the present case, is arranged on the battery cell housing 12 and, namely, between the two connection terminals 20, 22, however, it is not only possible to determine whether the switching element 24 is closed or open.

Figure 2:
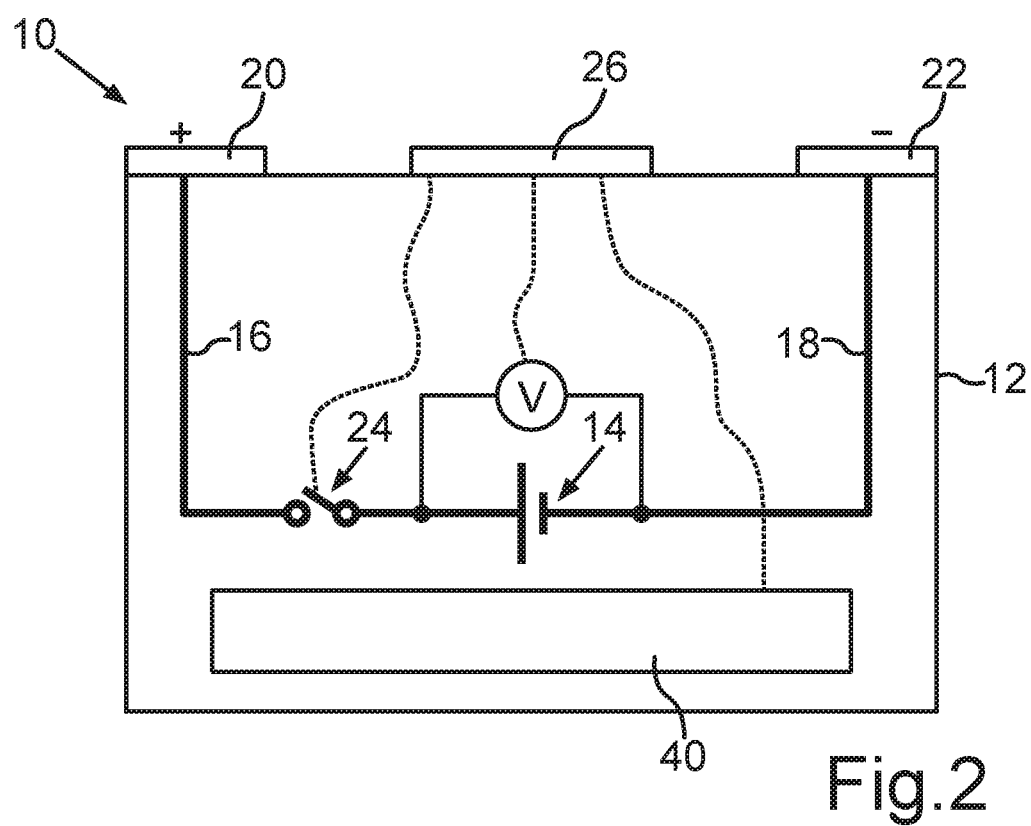
FIG. 2 the battery cell in accordance with FIG. 1 in a schematic side view, in which components arranged in the battery cell are illustrated.

As ensues, in particular, from FIG. 2, it is namely also possible by means of the indicator device 26, to determine the voltage that is supplied by the galvanic element 14. Thus, information relating to the cell voltage can also be transmitted to the person handling the battery cell 10.

Preferably, furthermore, the indicator device 26 is coupled to sensors 40, which can record a plurality of other parameters relating to the battery cell 10. In particular, a temperature inside of the battery cell housing 12 can be recorded by means of one of the sensors 40 and signaled via the indicator device 26. Through the recording of the temperature and/or of a pressure with suitable sensors 40, it can additionally be determined whether, for example, a thermal runaway looms in the battery cell 10, that is, for example, a fire. By means of the indicator device 26 itself and/or by means of one of the sensors 40, however, it is also possible to determine an overcharging of the battery cell 10 or a complete discharging thereof and accordingly to cause it to be displayed on the indicator device 26.

The indicator device 26 or an electronic control unit coupled to the indicator device 26 can additionally be designed for saving and/or analyzing data that are delivered by the sensors 40. By means of such an intelligent battery cell (smart cell), it is possible to signal a plurality of further states to the outside, such as, for instance, a state of charge of the battery cell 10, a state of health or state of aging, a number of charging cycles or discharging cycles, or the like.

Furthermore, current values, such as, for instance, the internal pressure as well as, in particular, highest values of pressures that have occurred inside of the battery cell housing 12 in the past, can be signaled to the outside via the indicator device 26. It is also possible to record and display peak values or highest values of accelerations to which the battery cell 10 has been exposed, a current intensity, the temperature, mechanical stresses, and the like and to communicate them by means of the indicator device 26 in such a way that they can be identified from outside of the battery cell housing 12.

The bandwidth of the information that can be provided by means of such an active state indicator in the form of the indicator device 26 depends on the intelligence integrated into the battery cell 10, that is, in particular, on the parameters that can be recorded by means of the indicator device 26 and/or the sensor 40 as well as the analysis thereof. Such an analysis can occur, in particular, by way of an analysis device integrated into the indicator device 26.

In particular, because it is possible to indicate by means of the indicator device 26 whether the switching element 24 is closed or open, an especially safe handling of the battery cell 10 is possible. In the case of an open switching element 24, namely, the electrically conductive connection between the arrester 16 and the connection terminal 20 is interrupted. This information is, in particular, of advantage during handling of the battery cell 10, for instance in the scope of service or repair of the battery comprising the battery cells 10.

The same applies for the situation involving an accident of a motor vehicle having a battery with a plurality of battery cells 10. In this case, too, it is of advantage for responding personnel, for example, when it can readily be determined whether a hazard arises from the battery cells 10 and the battery.

The invention claimed is:

1. A plurality of battery cells for a battery of a motor vehicle, comprising:
a battery cell housing, in which a galvanic element is housed, and with two electrical connection terminals, by way of which at least one battery cell can be connected electrically to at least one further battery cell of the battery, wherein the at least one battery cell has at least one indicator device, on the basis of which a state of the at least one battery cell that depends on at least one parameter of the at least one battery cell that can be detected or recorded by measurement technology can be identified from outside of the battery cell housing, wherein the indicator device is designed for the purpose of indicating a change in the state of the at least one battery cell,
wherein the at least one indicator device is arranged between the two electrical connection terminals at an outer side of the battery cell housing, and
wherein the at least one indicator device is provided on each of the at least one battery cell and the at least one further battery cell of the battery, and
wherein the galvanic element is designed as a secondary element which is discharged for supplying an electrical energy to electrical components including the at least one indicator device and recharged after being discharged.

2. The plurality of battery cells according to claim 1, wherein the at least one indicator device is designed for the purpose of indicating a switching state of at least one switching element, which is designed to make and to break an electrically conductive connection between an arrester of the galvanic element and at least one of the electrical connection terminals.

3. The plurality of battery cells according to claim 2, wherein the at least one switching element includes at least one semiconductor component, and the at least one switching element is switched by means of a driver module that is arranged inside of the battery cell housing.

4. The plurality of battery cells according to claim 1, wherein the at least one indicator device is designed for the purpose of indicating at least one of a transport state, an installation state and a defect of the at least one battery cell, wherein the transport state and the installation state can be activated by a control unit of the at least one battery cell.

5. The plurality of battery cells according to claim 1, wherein the at least one indicator device and at least one sensor that is coupled to the at least one indicator device are designed for the purpose of detecting or recording the at least one parameter, which comprises:
a voltage;
a temperature;
a current intensity of a current flowing through the at least one battery cell;
a pressure;
a mechanical stress;
a nature of an electrolyte of the galvanic element; and
an acceleration;
wherein the at least one indicator device is designed for the purpose of indicating the state of the at least one battery cell in relation to the at least one parameter.

6. The plurality of battery cells according to claim 1, wherein the at least one indicator device is designed for the purpose of indicating at least one single value, which indicates at least one of:
a state of charge of the at least one battery cell;
a state of health of the at least one battery cell;

a number of charging operations and/or discharging operations;
a temperature;
a pressure;
a voltage;
a current intensity;
a mechanical stress;
an acceleration; and
a nature of an electrolyte of the galvanic element.

7. The plurality of battery cells according to claim 1, wherein the at least one indicator device further comprises
at least one illuminated device;
a display screen;
and is designed for the output
of an acoustically detectable signal and
of a haptically detectable signal.

8. The plurality of battery cells according to claim 1, wherein the at least one indicator device:
is designed for amplifying a signal correlating with the state of the at least one battery cell and
for being supplied with electric energy is coupled to the galvanic element and to an electric energy storage unit, and
is designed for wirelessly receiving transmitted energy.

* * * * *